Patented June 16, 1931

1,810,012

UNITED STATES PATENT OFFICE

IVAN GUBELMANN, HENRY J. WEILAND AND OTTO STALLMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

2-AMINO-7-CHLORO-ANTHRAQUINONE AND PROCESS OF MAKING THE SAME

No Drawing.   Application filed July 2, 1927.   Serial No. 203,263.

This invention relates to 2-amino-7-chloro-anthraquinone and to a process for making the same.

It is an object of this invention to provide a simple and efficient method for making 2-amino-7-chloro-anthraquinone, which is an intermediate for valuable dyestuffs.

Other and further important objects of this invention will become apparent from the disclosures in the following description and appended claims.

We have now discovered that 2-nitro-7-chloro-anthraquinone, described and claimed in our co-pending application Serial No. 203,262, filed July 2, 1927, under certain conditions can be reduced to 2-amino-7-chloro-anthraquinone. It was not to be anticipated that this reduction would run so smoothly, giving such excellent yields of the reduced product, since this is the first beta-nitro-anthraquinone, to the best of our knowledge, which has been reduced successfully.

Our method consists in reducing 2-nitro-7-chloro-anthraquinone with sodium sulphide, sodium disulphide, glucose and caustic alkali, or the like. It was quite unexpected that this reduction should give such excellent yields, apparently free of by-products, since there was a possibility that the alkaline reacting substances used as reducing agents might react with the chlorine group, especially as there are acid groups present in the molecule, such as $NO_2$ and $CO$. We have found, however, that the acid groups present have no influence on this latter reaction and that the reduction reaction proceeds practically quantitatively to the desired end product.

This reaction is probably best expressed by the following chemical equation:

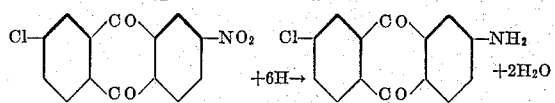

2-amino-7-chloro-anthraquinone crystallizes from chloro-benzene in the form of light orange colored needles, which melt at 302 to 303° C. The compound is practically insoluble in cold organic solvents, such as chloro benzene, alcohol and glacial acetic acid, and only sparingly soluble in hot alcohol, glacial acetic acid or chloro benzene.

Without limiting our invention to any particular procedure, the following example, in which parts by weight are given illustrates the application of our invention in the preferred form:

287 parts of 2-nitro-7-chloro-anthraquinone are suspended in 5000 parts of water containing 40 parts of caustic soda and 625 parts of sodium sulphide ($9H_2O$). The mass is heated to the boiling point and boiled for 1 to 2 hours. The product is then filtered off, washed with hot water and dried. The yield of 2-amino-7-chloro-anthraquinone is practically quantitative.

We are aware that numerous details of the process may be varied through a wide range without departing from the principles of this invention, and we therefore, do not purpose limiting the patent granted hereon, otherwise than necessitated by the prior art.

We claim as our invention:

1. The process of preparing 2-amino-7-chloro-anthraquinone, which comprises reducing 2-nitro-7-chloro-anthraquinone by means of sodium sulphide in the presence of caustic alkali at boiling temperature and filtering off the product.

2. As a new article of manufacture, 2-amino-7-chloro-anthraquinone, having most probably the following chemical constitution:

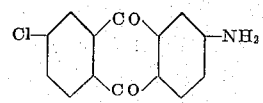

which may be prepared by reducing 2-nitro-7-chloro-anthraquinone with sodium sulphide at an elevated temperature.

In testimony whereof we have hereunto subscribed our names at Carrollville, Milwaukee County, Wisconsin.

IVAN GUBELMANN.
HENRY J. WEILAND.
OTTO STALLMANN.